Jan. 19, 1926. 1,570,036
F. H. BEYEA
PROCESS AND MACHINE FOR SHAPING WIRE
Filed Oct. 5, 1921  4 Sheets-Sheet 1
Fig.1
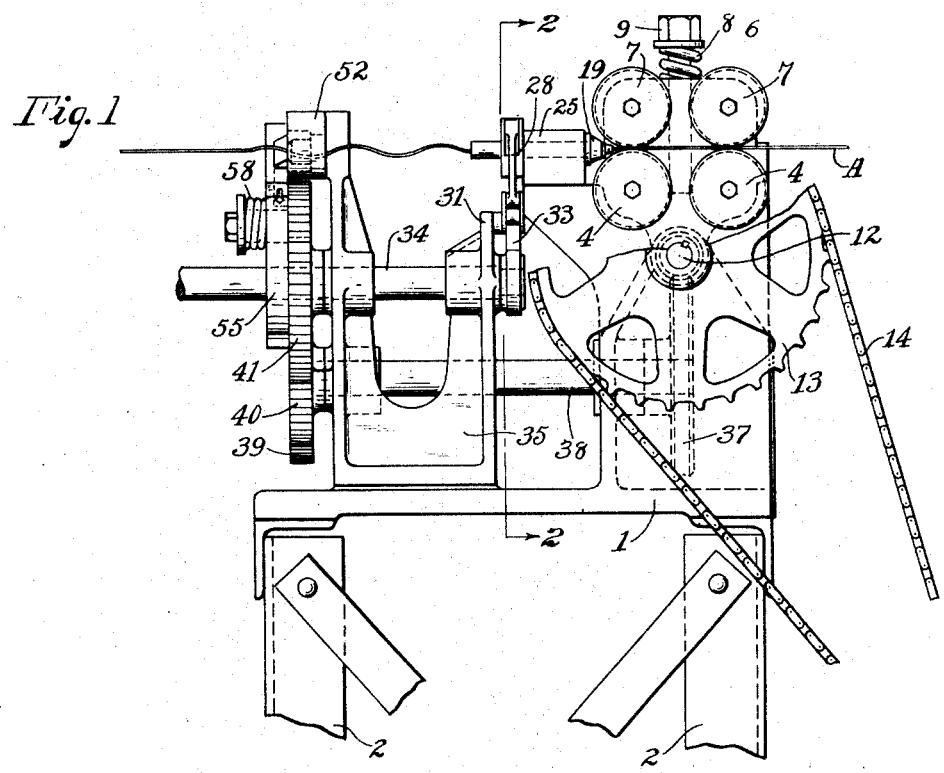
Fig.2
Fig.3
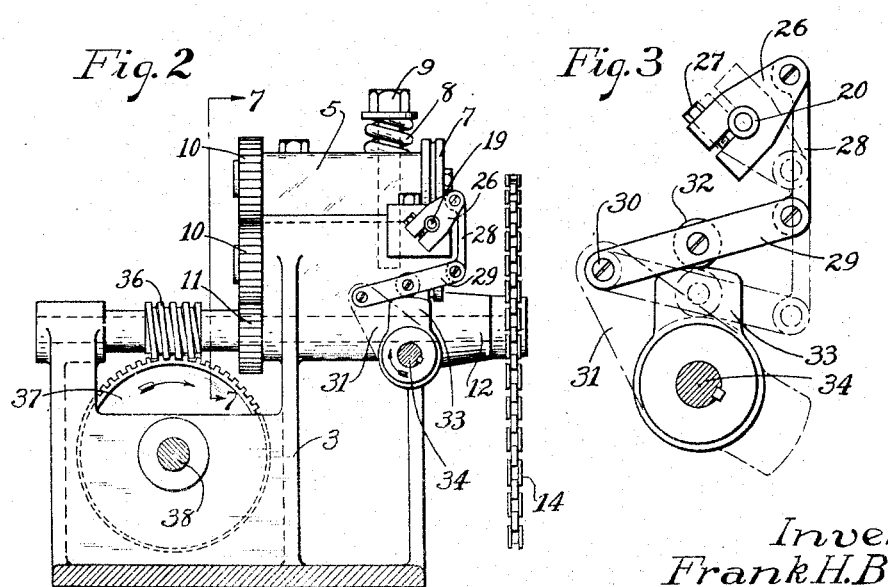
Inventor
Frank H. Beyea.
By
Atty.

Jan. 19, 1926.  1,570,036
F. H. BEYEA
PROCESS AND MACHINE FOR SHAPING WIRE
Filed Oct. 5, 1921    4 Sheets-Sheet 2
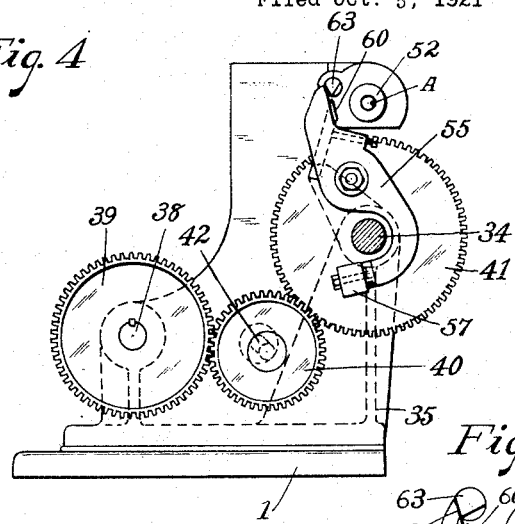
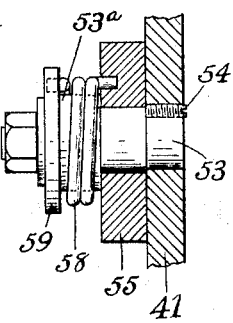
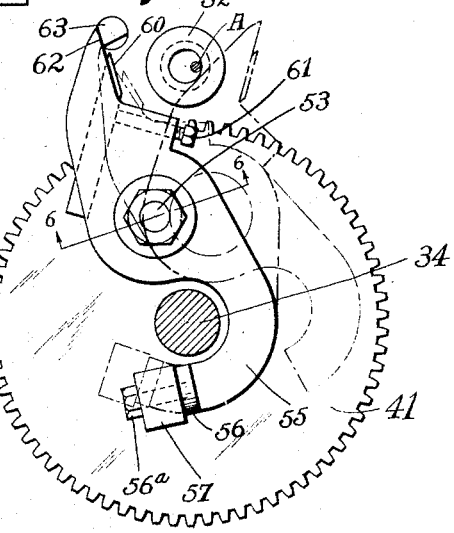
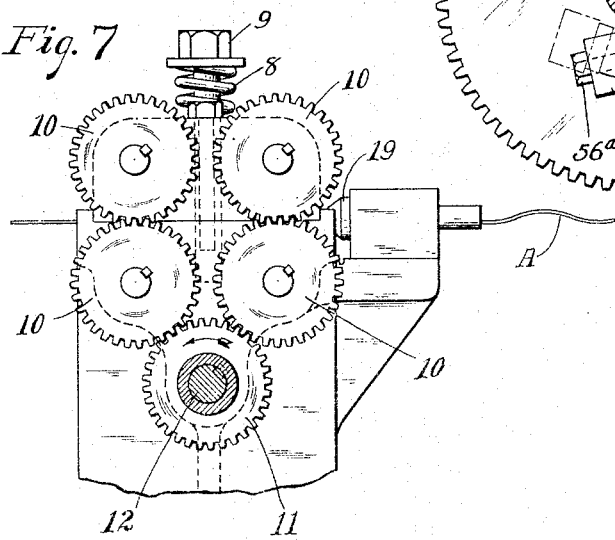
Inventor
Frank H. Beyea.
By
Atty.

Jan. 19, 1926. 1,570,036
F. H. BEYEA
PROCESS AND MACHINE FOR SHAPING WIRE
Filed Oct. 5, 1921  4 Sheets-Sheet 3
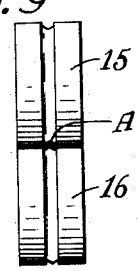
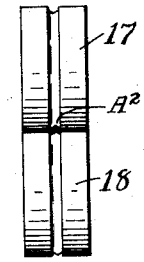
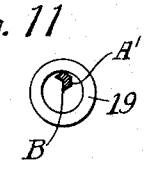
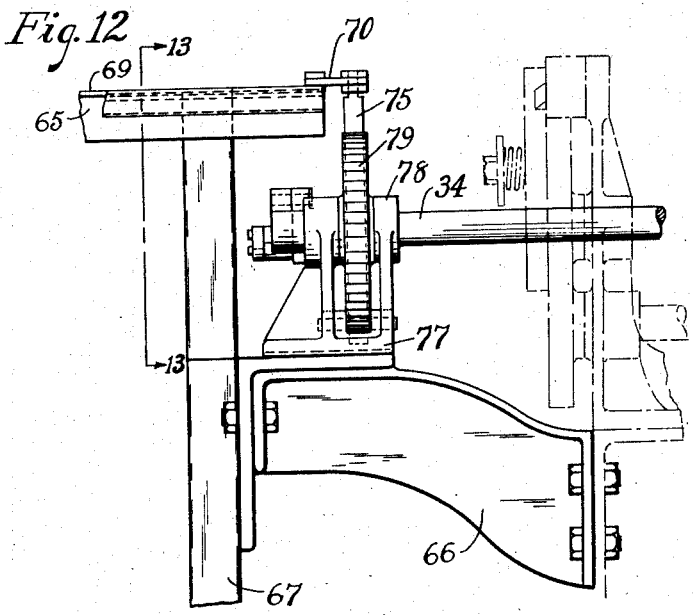
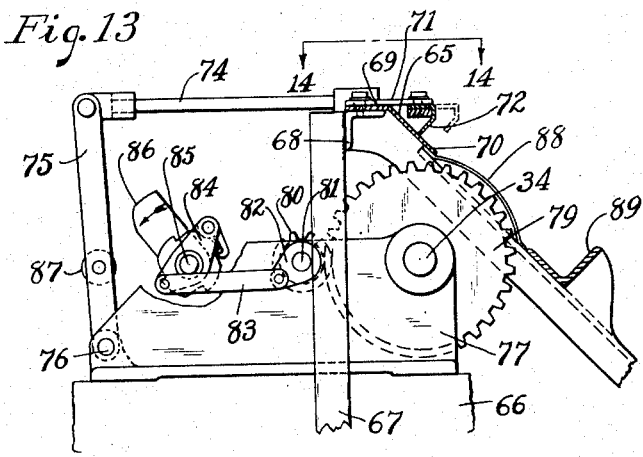
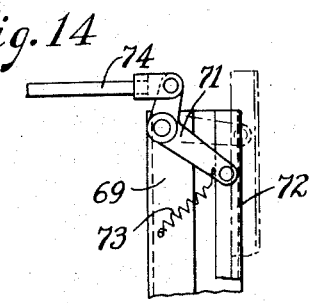
Inventor
Frank H. Beyea.
By G. L. Ely
Atty.

Jan. 19, 1926. 1,570,036
F. H. BEYEA
PROCESS AND MACHINE FOR SHAPING WIRE
Filed Oct. 5, 1921 4 Sheets—Sheet 4
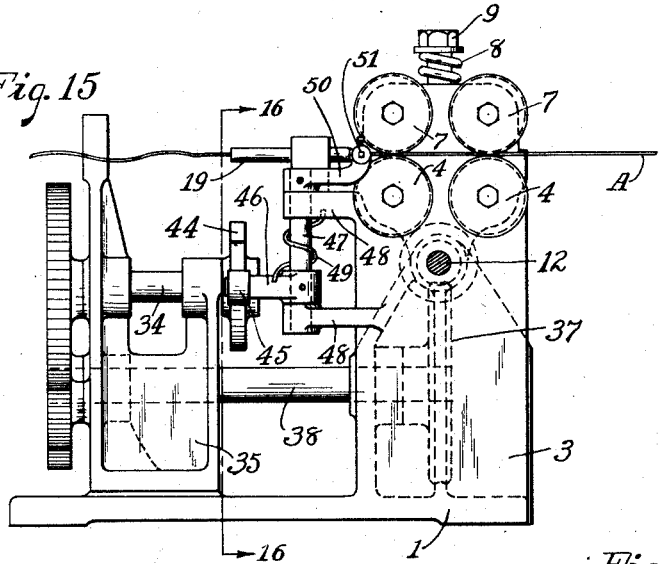
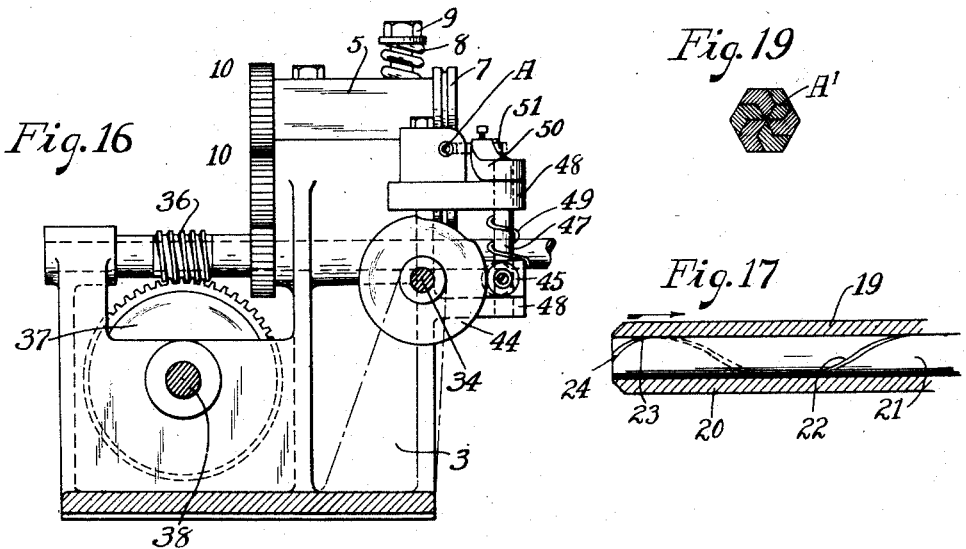
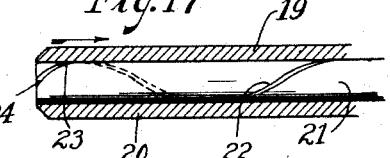
Inventor
Frank H. Beyea.
By G. L. Ely
Atty.

Patented Jan. 19, 1926.

1,570,036

UNITED STATES PATENT OFFICE.

FRANK H. BEYEA, OF AKRON, OHIO, ASSIGNOR TO JOHN R. GAMMETER, OF AKRON, OHIO.

PROCESS AND MACHINE FOR SHAPING WIRE.

Application filed October 5, 1921. Serial No. 505,627.

*To all whom it may concern:*

Be it known that I, FRANK H. BEYEA, a citizen of the United States, residing at Akron, in the county of Summit, State of Ohio, have invented certain new and useful Improvements in Processes and Machines for Shaping Wire, of which the following is a specification.

This invention relates to a method and apparatus for the manufacture of articles made of wire, and particularly to the preparation of the wire prior to its fabrication into the completed article. The wire formed in the machine and by the method of the present invention may be useful in many ways, but it is particularly designed and intended for use in the manufacture of endless grommets or cable rings, such as used in many relationships and especially in the manufacture of inextensible or straight-side beads for pneumatic tires.

In certain prior inventions I have proposed the manufacture of endless cables or grommets from a single wire or from a core wire and a single covering wire in which the outer wire of the cable was formed with a spiral while in a length and before the covering or wrapping operation. I have also proposed the use of a wire of peculiar and distinctive cross-section in which the sides of the strand of wire taper toward or converge at the center of the wire, the wire being preferably formed with interlocking formations and it is the object of this invention to devise a means and method by which this wire may be drawn to its proper shape and spiralled so as to be ready for the wrapping operation which forms it into the endless cable or grommet.

The bead or grommet which is made of a single wire, is preferably formed with straight and spiralled portions, the straight portion serving as a foundation or core over which the spiralled covering wire is wound. The straight portion may be in a single length or it may be in two separated or isolated portions which together form the core. The details of the grommet are not part of the present invention and will not be further described.

The machine of the present invention is designed to form a single unit of wire in spiral form with or without the appropriate straight or unspiralled portions and when enough of the wire has been passed through the machine, it will be automatically cut off and placed in a bin or hopper from which it may be taken to the winding or wrapping machine. It is also an object of the present invention to provide means for drawing or shaping the wire into any peculiar cross-section and at the same operation to spiral the wire. When these two operations are performed concurrently, the work may be done more accurately and with better results as will appear.

The showing of the machine and the description of the invention is such as will enable one skilled in the art to practice the same, and it will be understood that I am not limited to precise details of the machine or to close following of the method, as both may be varied within the scope of the invention.

In the drawings:

Fig. 1 is a side elevation of the machine for preparing the wire.

Fig. 2 is a section on the line 2—2 of Fig. 1 looking into the spiralling die or quill.

Fig. 3 is an enlarged detail view of the device for turning or rotating the die or quill.

Fig. 4 is a view looking at the cut-off mechanism.

Fig. 5 is an enlarged view of the knife showing the means for operating the same.

Fig. 6 is a section on the line 6—6 of Fig. 5.

Fig. 7 is a section on the line 7—7 of Fig. 2 showing the driving mechanism for the feeding or drawing rolls for the wire.

Figs. 8, 9 and 10 are views showing the rolls, of which those shown in Figs. 9 and 10 may be used for drawing down the wire into special cross-sections before the spiralling operation.

Fig. 11 is an enlarged cross-section showing the relationship of a wire of special cross-section to the die or quill.

Fig. 12 is a side elevation of one end of the trough which receives the spiral wire.

Fig. 13 is a section on the line 13—13 of Fig. 12, showing the means for opening the trough to discharge the cut-off section of wire into the magazine or hopper.

Fig. 14 is a detail, the location being indicated by the line 14—14 of Fig. 13.

Fig. 15 is a side elevation of a modified form of machine.

Fig. 16 is a section on the line 16—16 of Fig. 15.

Fig. 17 is an elevation, enlarged, showing the quill or die.

Fig. 18 is a view showing a short section of wire and made with the machine.

Fig. 19 is a cross-section of a cable made from wire formed as shown in Figs. 8 to 11 inclusive.

The method of the invention comprises the forming of a length of wire into straight and spiral portions by passing the wire through a quill or die, or other means by which it may be spiralled and periodically and for predetermined periods, rendering the spiralling means inoperative so that the wire leaves the spiralling means or passes through it for the proper distance to make a straight section of wire. It also comprises the steps of shaping or drawing a wire to any special or peculiar cross-section and then immediately spiralling it. It is advisable to perform the spiralling operation immediately after the shaping operation to avoid twisting or displacement of the wire with respect to the spiralling the device.

The machine comprises the drawing or shaping and feeding rolls, and a suitable spiralling device with means for rendering it inoperative at certain times. In the present embodiment of the invention the spiralling device comprises a quill or die and it may, at intervals, be rendered inoperative to give a spiral to the wire, by rotating the quill or by guiding the wire into the quill so that it will not be spiralled. The machine also includes an automatic cut-off device, which severs the wire into proper lengths for the use to which it is put.

The machine comprises a platform or support 1, mounted on suitable standards 2. From the support rise brackets or standards 3 in the upper surface of which are rotatably mounted the lower feeding rolls 4. Above the bracket is a vertically sliding housing 5 which carries the upper feeding rolls 7, the upper rolls being pressed against the lower rolls by a spring 8, confined by a bolt 9. The rolls are driven by intermeshing gears 10 which derive their power from a master gear 11, carried on a main drive shaft 12 mounted in the bracket 3, being driven by a sprocket 13 and chain 14 from a suitable source of power.

Any suitable number or arrangement for the rolls 4 and 7 may be used and their purpose is to feed and straighten the wire. If a special or peculiar cross section of wire is to be used, such for example as the form of the cables of Fig. 19, the rolls may be as shown at 15 and 16, 17 and 18 in Figs. 9 and 10, in which case the wire will be drawn down to the required cross-section.

From the rolls of either group, the wire A passes directly to the spiralling device. While any suitable form of apparatus for the purpose may be used, I have here shown the well known quill or die indicated as a whole by the numeral 19 and shown in detail in Fig. 17. This comprises a tube or sleeve 20 in which is located a rod 21 on the surface of which is formed the spiral worm 22. The wire passes through the die in the direction of the arrow in Fig. 17 and the entrance or first part of the worm is usually on a sharper spiral than the remainder, as shown at 23. The entrance or opening 24 to the worm is at one side of the quill.

It has been found that the wire spirals only when and to the extent that the opening 24 is to one side of or out of line with the wire, as it issues from the feed rolls and I utilize this fact in the accomplishment of the process and in the machine in forming a wire, part spiralled and part straight.

The die or quill is rotatably mounted in a bearing 25, on the bracket 3 and is adapted to be rotated to bring the opening 24 in line or out of line with the feed of the wire by any desired means. I have here shown an arm 26 encircling the tube 20 and securely clamped thereto by a bolt 27. The arm 26 is rocked and the quill rotated by a link 28, connected to the rocking lever 29, which is in turn pivoted at 30 on a bracket 31. Midway of the lever 29 is a roller 32 which is in the path of a cam 33 carried on a shaft 34. Shaft 34 is rotatably mounted in a standard 35, carried by the base plate 1, which standard also carries the bracket 31.

Where a single straight length of wire and a single spiral as shown in Fig. 18 are desired, the cam is shaped as shown in Fig. 3, but if alternating spirals and straight portions are desired, the cam would be shaped accordingly, the high part of the cam holding the spiral in position with the opening 24 in line with the feed of the wire so that no spiralling action is had. The low portion of the cam will turn the quill the proper distance to give the desired diameter of the spiral.

The shaft 34 is driven in timed relation to the feed of the wire from the shaft 12 by means of a worm 36 on the latter, which meshes with a gear 37 on a line shaft 38. The shaft 38 carries a gear 39, meshing with idler 40 which in turn gears into gear 41 secured to the shaft 34. Variations in length of feed relative to the spiral or to the cutting off mechanism, (to be described later) may be obtained by changing gears 39 and 40, the bearing for the gear 40 being adjustable in slot 42 on standard 35.

Instead of moving the die 19 to change its position with respect to the line of feed of the wire so as to obtain a straight wire, the wire A itself may be moved and the same results will be obtained. The modifications of the machine to accomplish this result is shown in Figs. 15 and 16. The wire passes from the feed rolls 4 and 7 into a stationary die 19, and between the rolls and the die is located a device periodically to push the wire over so that it will be in line with the mouth 24 of the die.

The shaft 34 in this modification, carries a cam 44 against which bears a roller 45 on the end of an arm 46 which is secured to a vertical shaft 47 carried on brackets 48. A coil spring 49 may be applied to the shaft 47 to keep the roller against the cam although the tension of the wire A may be found sufficient for this purpose. The upper end of the shaft 47 carries an arm 50 the free end of which is curved upwardly in line with the wire and carries an adjustable presser foot 51 which bears against the wire. For a predetermined period or periods during the spiralling of a single unit or wire, the presser foot, actuated by the low portions of the cam, moves the wire over in line with the entrance to the die and the wire comes out straight instead of spiralled.

Where the wire is formed in special shapes as shown at $A^1$ and $A^2$ in Figs. 9, 10 and 11, the fact that the wire passes directly to the die is very helpful to the operation of the machine, as otherwise, with a wire previously formed to shape, difficulty might be experienced in guiding the wire into the die correctly. As it is shown in the machine, the wire does not have an opportunity to twist, and enters the worm in the die in correct position.

In the form of wire shown in Figs. 11 and 19 the wire $A^1$ extends to and fills up the center of the cable and necessity for a straight length of wire to form the core is not present. As a result the means for temporarily dispensing with the spiralling operation is not present and the devices shown in Figs. 2 and 3 and 15 and 16 may not be used. In this case, however, the inner edge of the wire should coincide with the center line or axis of the spiral as shown in Fig. 11 in which the point B denotes the axis of the spiral and the center line of the quill or die.

As the wire leaves the die or spiralling device, it passes through an eye or guide 52 on the bracket 35, the diameter of which is large enough to accommodate the spiral and the inner edge of which is hardened to make a cutting surface. When the proper length of wire has passed through the guide 52 it is arranged to be severed automatically by any suitable means.

There is here shown an example of automatically acting knife, timed in proper relation to the travel of the wire. On the face of the gear 41 is carried a pivot pin 53 secured by set screw, 54, on the outer end of which is pivotally mounted an arm 55. One end of the arm 55 is bent around the shaft 34 and bears upon a resilient block or bumper 56 held by screw 56$^a$ on a block 57 on the face of the gear 41. A coil spring 58 surrounds an enlarged boss 53$^a$ on the pin 53 and is secured at its outer end in a disk 59 on the end of the pin and at its other end is attached to the arm 55. The boss or collar 53$^a$ keeps the knife in close contact with the face of the gear 41.

The outer end of the arm 55 carries a knife 60, adjustably held by set-screw 61 the knife being so located as to pass over the guide 52. The arm is provided with a tail piece 62 and located on the guide 52 or at some other fixed point, is a catch-pin 63. As the gear 41 rotates in timed relation to the speed of travel of the wire the tail piece 62 will strike the pin 63. Continued rotation of the gear causes the arm to rotate backwardly on the pin 53 until the tail piece passes beneath the pin 63, when it will snap forwardly and the knife 60 will sever the wire at the proper point against the guide 52, clearing the opening of the guide, as shown in dotted lines so as to not interfere with the continuous forward movement of the wire.

Suitable means are provided for receiving the spiral as it passes through the guide 52, which in the form of machine shown comprises a trough or holder 65. The wire is rotating on its axis as it leaves the die in a spiral as will be understood.

To the framework 1 is attached a bracket 66 to which is secured a table or framework 67. Across the front of the table is fastened a stringer 68 to the surface of which is secured an angular plate 69 the lower part of which is inclined downwardly as at 70 to form the immovable side of the trough 65. At one or more points on the horizontal portion of the plate 69 are pivoted bell-crank levers 71. One end of a bell-crank lever 71 is pivoted to an angular plate 72, bent downwardly to form the V-shaped trough 65, with the portion 70 of the plate 69. A spring 73 holds the plate 72 against the plate 69 and returns it after the opening movement thereof.

Pivoted to the end of lever 71 remote from the plate 72, is an adjustable link 74, which is in turn pivoted to a lever 75 rockingly mounted at 76. The shaft 34 is extended and is mounted in bearings 78 secured to the top of bracket 66, the shaft carrying a gear 79 meshing with pinion 80 carried on a shaft 81 to which is secured a crank 82. This crank is connected by a link 83 to a pawl carrying rocker 84 which actuates a shaft 85. The shaft 85 has secured to it a cam 86 arranged to strike a roller 87 located on the lever 75.

As the shaft 34 rotates it will cause the cam 86 to operate the cranks 71 and open up the trough, as shown in dotted lines in Fig. 13, after each length of wire is cut off. The length of spiral wire will then drop down the inclined face 88 and into a magazine or receptacle 89 from which the lengths may be removed as required.

The operation of the machine will have been understood as the description proceeded. As the wire A passes through the rolls it is straightened and may be formed into suitable or special cross section. It then passes into the die or spiralling quill by which it is spiralled and from which it passes through the guide 52 and into the trough 65. If straight and spiralled portions are desired, the cams 33 or 44 will operate to cause the wire to be passed through the die without spiralling, the length and locations of the straight portions being determined by the design of the cams. At the proper time the length of wire is cut off and the trough opens up to discharge the wire into the magazine.

It will be understood that modifications and variations may be made in the form or design of the parts without changing the invention or sacrificing any of its benefits. Different forms of spiralling devices may be used and other means may be devised for rendering the spiralling mechanism inoperative and the cutting and discharging mechanism may be altered within the scope of the invention. Such modifications and alterations as do not remove the machine or process from within the broad scope of my invention are intended to be covered herein within the broad construction of the claims.

Claims:—

1. A process for preparing wire for the manufacture of grommets or other uses, comprising feeding a length of wire through a spiralling device and rendering said spiralling device inoperative for a predetermined period.

2. A process for preparing wire for the manufacturing of grommets or other uses, comprising feeding a length of wire through a spiralling device and rendering said device inoperative without interrupting the movement of the wire.

3. A process for the purposes set forth comprising feeding a length of wire, spiralling it by a bending operation and shifting the line of travel of the wire to discontinue the bending action.

4. A process for the purposes set forth comprising feeding a length of wire, spiralling it by bending it through a die and shifting the relative position of the wire and the mouth of the die to discontinue the bending operation.

5. A process of manufacturing a wire having straight and spiral portions comprising passing it through a die with a bending operation and shifting the wire and the die relatively to discontinue the bending action.

6. A process of manufacturing a wire having straight and spiral portions, comprising passing it through a die, the mouth of which is out of line with the feed of the wire to bend the same, and shifting the wire and the die relatively to one another to discontinue the bending action.

7. A process of manufacturing a wire having straight and spiral portions comprising passing it through a die, the mouth of which is out of line with the feed of the wire and intermittently moving the die so as to bring the mouth in line with the wire to form a straight portion therein.

8. A process for the manufacture of a wire having straight and spiral portions, comprising passing the wire into a spiralling die, the mouth of which is out of line with the feed of the wire so that the wire is bent upon entering the die and intermittently rotating the die so as to bring the mouth in line with the feed of the wire to eliminate the bend therein.

9. A process for the preparation of wire for use in the manufacture of cables, comprising drawing the wire to its desired cross-section and passing it into a spiralling device as it leaves the drawing operation.

10. A process for the preparation of non-round wire for use in the manufacture of articles having a spirally wound wire therein, comprising drawing the wire to its finished cross section and passing it into the spiralling device immediately thereafter.

11. The process of preparing wire for the manufacture of cables or the like, comprising drawing the wire to a cross-section with sides converging and spiralling the wire as a part of a continuous operation.

12. In a machine for the purposes set forth, the combination of feed rollers for wire, a spiralling device and means for rendering the spiralling device inoperative at intervals whereby straight and spiral portions are formed in the wire.

13. In a machine for the purposes set forth, the combination of means for feeding a wire and a spiralling device through which the wire passes, and means for rendering the spiralling device inoperative at intervals.

14. In a machine for the purposes set forth, the combination of means for feeding a wire and means for bending the wire to form a spiral therein, and a device for removing the bend from the wire.

15. In a machine for the purposes set forth, the combination of means for feeding a wire and means for spiralling the wire by bending it out of its line of travel and means operating upon the wire for shifting its line of travel relative to the spiralling means to remove the bend in the wire.

16. In a machine for the purposes set forth, the combination of means for feeding a wire, and a spiralling die the mouth whereof is out of line with the feed of the wire and means for shifting the wire and the die relatively to one another to move the mouth of the die in line with the wire.

17. In a machine for the purposes set forth, the combination of means for feeding a wire and a movable spiralling die, the mouth whereof is out of line with the feed of the wire to form a bend therein, and means for moving the die to bring the mouth thereof in line with the wire, whereby the bend is removed.

18. In a machine for the purposes set forth, the combination of a continuously operating feeding means for wire, and a rotatable spiralling die and means for rotating the die at intervals during the feeding of the wire to render the spiralling die inoperative.

19. In a machine for the purposes set forth, the combination of a continuously operating feeding means for wire, a spiralling die, a movable mounting for the die and means operated in timed relation to the feed of the die to shift the mouth thereof relative to the line of feed of the wire.

20. In a machine for the purposes set forth, the combination of a continuously operating wire feeding means, a die through which the wire passes, the mouth of the die being out of line with the direction of the oncoming wire and means to vary the position of the die with respect to the wire.

21. In a machine for the uses and purposes set forth, a wire feeding roller, a spiralling die adjacent the roller, a rotatable mounting for the die and means to rotate the die at predetermined intervals with relation to the feeding of the wire.

22. In a machine for the purposes set forth, feeding rolls for the wire, a spiralling die adjacent the rolls, a rotatable mounting for the die, means connected with the die for rotating the same, and cam for operating the last named means and driving connections between the rolls and the cam.

23. In a machine for the purposes set forth, feeding rolls for the wire, a spiralling device adjacent the rolls, means to shift the wire and the spiralling device relatively to one another, a cam for shifting said wire and die and driving connections between the cam and the feeding roll.

24. In a machine for the purposes set forth, means for feeding a wire, means for forming spiral and straight portions in the wire and a severing mechanism for the wire operated in timed relation to the forming means.

25. In a machine for the purposes set forth, means for feeding a wire, means for forming spiral and straight portions in the wire, a cutting device for the wire operated in timed relation to the forming means and a trough to receive the spiralled wire.

26. In a machine for forming wire, feeding rolls, a spiralling die, a knife, means for rendering the spiralling die inoperative at intervals and a knife for cutting off sections of the wire.

27. In a machine for forming wire, feeding rolls, a spiralling die, a knife, means for varying the shape of the wire, as it passes through the die, and means for operating the knife in timed relation to the feed of the wire.

28. In a machine for forming wire, means for feeding and shaping a wire into a spiral and a trough in which the spiral wire is received and in which it can rotate upon the axis of the spiral.

29. In a machine for forming wire, means for feeding and shaping a wire into a spiral and a trough in which the spiral wire is received and in which it can rotate, means for severing the wire at predetermined intervals and means to open up the trough to discharge the length of wire after it is cut off.

30. In a machine for forming lengths of spiralled wire, a die through which the wire passes and by which it is spiralled, a guide for the spiral of wire and a knife arranged to be passed across the guide to cut off the wire.

31. In a machine for forming lengths of spiralled wire, a die through which the wire passes and by which it is spiralled, a guide for the spiral of wire and a knife arranged to be snapped across the guide at predetermined intervals with relation to the length of the spiral.

32. In a machine for forming lengths of spiralled wire, a die through which the wire passes and by which it is spiralled, a guide for the spiral of wire, a knife, means for causing the knife to pass rapidly over the guides to sever the wire without interfering with the movement of the wire.

33. In a machine for forming lengths of spiralled wire, a die through which the wire passes and by which it is spiralled, a guide for the spiral wire, a knife, means for causing the knife to pass rapidly over the guide to sever the wire without interfering with the movement of the wire and a trough for receiving the spiral.

34. In a machine for forming lengths of spiralled wire, a die through which the wire passes and by which it is spiralled, a guide for the spiral wire, a knife, means for causing the knife to pass rapidly over the guide to sever the wire without interfering with the movement of the wire, a trough for receiving the spiral and means for opening up the trough to discharge the spiralled wire.

35. In a machine for forming lengths of wire having spiral and straight portions, means for feeding the wire in a continuous movement, a spiralling die, means for rotating the die at intervals so as to form the straight portion of the wire, a guide for the wire as it leaves the die, a knife for severing the wire without interrupting the feeding movement thereof, and a trough to receive the wire.

36. In a machine for forming lengths of wire having spiral and straight portions, means for feeding the wire in a continuous movement, a die operating to form the spiral by a bending operation, means for shifting the wire and the die relatively to one another to form the straight portion of the wire and means for cutting off predetermined lengths of wire without interrupting the feeding of the wire.

37. In a machine for forming lengths of wire, having spiral and straight portions, means for feeding the wire in a continuous movement, a die operating to form the spiral by a bending operation, means for shifting the wire and the die relatively to one another to form the straight portion of the wire, means for cutting off predetermined lengths of wire without interrupting the feeding of the wire, and a trough for the reception of the spiral wire.

FRANK H. BEYEA.